(12) United States Patent
Hadley (10) Patent No.: US 6,672,221 B2
(45) Date of Patent: Jan. 6, 2004

(54) AIRCRAFT STORAGE TURNTABLE, HANGAR ASSEMBLY AND METHOD

(75) Inventor: Carleton J. Hadley, Mooresville, NC (US)

(73) Assignee: Carousel Hangars, Inc., Mooresville, NC (US)

( * ) Notice: Subject to any disclaimer, the term of this patent is extended or adjusted under 35 U.S.C. 154(b) by 0 days.

(21) Appl. No.: 10/229,504

(22) Filed: Aug. 28, 2002

(65) Prior Publication Data

US 2003/0145760 A1 Aug. 7, 2003

Related U.S. Application Data

(60) Provisional application No. 60/354,585, filed on Feb. 5, 2002.

(51) Int. Cl.[7] ................................................. B61J 1/00
(52) U.S. Cl. .............................. 104/35; 104/48; 105/28
(58) Field of Search ............................... 104/35, 38, 41, 104/45, 46, 48, 44; 105/28; 198/465.1, 465.2; 248/349.1, 364.05

(56) References Cited

U.S. PATENT DOCUMENTS

| | | | | |
|---|---|---|---|---|
| 1,590,534 A | * | 6/1926 | Mader | 104/35 |
| 2,903,978 A | * | 9/1959 | Gaynor | 104/29 |
| 2,964,144 A | * | 12/1960 | Wheeler | 52/65 |
| 3,566,798 A | * | 3/1971 | Peitzman | 104/44 |
| 4,498,398 A | * | 2/1985 | Vallee | 104/44 |
| 4,750,428 A | * | 6/1988 | Hyte et al. | 104/40 |
| 5,245,929 A | * | 9/1993 | Wertz et al. | 104/35 |
| 5,365,723 A | * | 11/1994 | Ramos | 53/556 |
| 5,626,079 A | * | 5/1997 | Summers | 104/44 |
| 5,755,160 A | * | 5/1998 | Blufordcraving | 104/36 |

* cited by examiner

Primary Examiner—S. Joseph Morano
Assistant Examiner—Frantz F. Jules
(74) Attorney, Agent, or Firm—Adams Evans P.A.

(57) ABSTRACT

A conveyance storage apparatus includes an annular turntable having an outer circumference and a central opening defining a support surface therebetween for supporting a plurality of conveyances, particularly aircraft, on parking spaces thereon. The turntable is supported on a foundation, and a rotation assembly is positioned between the turntable and the foundation for permitting rotation of the turntable on the foundation between storage and enter/exit positions. A stationary core is positioned within the central opening of the turntable and the turntable is mounted for rotation around the stationary core. The turntable can be positioned within an enclosure having an opening sized to permit only a single conveyance to enter or exit the enclosure at a time. The rotation assembly is electronically programmable to respond to a predetermined access code by moving a predetermined parking space to a conveyance entrance/exit position in relation to the enclosure opening.

28 Claims, 10 Drawing Sheets

AIRCRAFT STORAGE TURNTABLE, HANGAR ASSEMBLY AND METHOD

PRIORITY CLAIM

This application claims priority from U.S. Provisional Application Ser. No. 60/354,585, filed Feb. 5, 2002.

TECHNICAL FIELD AND BACKGROUND OF THE INVENTION

This invention relates to a turntable on which aircraft are parked for storage. The principal usage of the turntable will be within an enclosed hangar, but the turntable can be positioned at any location, inside or outside a storage building, and can be used for storing conveyances other than aircraft, such as automobiles, buses, military vehicles, and water craft. In its preferred usage in an aircraft hangar, it makes possible a high degree of security, storage of a large number of aircrafts within a relatively small area, and provides means to prevent damage resulting from inadvertent collisions between aircraft as they are moved into and out of the hangar.

Prior art turntables comprise a disk which pivots on a central axis. This type of structure is extremely heavy, requires many parts and is very expensive. The present invention achieves significant savings by forming the turntable in the shape of a doughnut which fits around a central foundation core, for example, fabricated from a finished concrete, and rotates over footings formed in an excavated ring into which the turntable is positioned. The turntable is flush with the central foundation core and the floor areas adjacent the circumference of the turntable.

SUMMARY OF THE INVENTION

Therefore, it is an object of the invention to provide a turntable assembly which permits compact storage of a plurality of conveyances.

It is another object of the invention to provide a turntable assembly which permits a plurality of conveyances to be stored in a safe and secure environment.

It is another object of the invention to provide a turntable assembly which permits a plurality of conveyances to be stored in a compact area while avoiding inadvertent contact and damage resulting therefrom.

It is another object of the invention to provide a turntable assembly which is adapted to support a plurality of aircraft.

It is another object of the invention to provide a turntable assembly which is intended to support a plurality of aircraft inside an aircraft hangar.

These and other objects of the present invention are achieved in the preferred embodiments disclosed below by providing a conveyance storage apparatus, including an annular turntable having an outer circumference and a central opening defining a support surface therebetween for supporting at least one conveyance in at least one parking space thereon, and a foundation for supporting the turntable. A rotation assembly is positioned intermediate the turntable and the foundation for permitting rotation of the turntable on the foundation between storage and conveyance enter/exit positions. A stationary core is positioned in the central opening of the turntable and the turntable is mounted for rotation around the stationary core.

According to a preferred embodiment of the invention, the support surface includes a plurality of radially spaced-apart parking spaces for supporting a plurality of conveyances parked thereon.

According to yet another preferred embodiment of the invention, the conveyance storage apparatus is positioned within an enclosure having an opening sized to permit only a single conveyance to enter or exit through the enclosure opening. The rotation assembly includes indexing means for moving any single parking space to a conveyance entrance/exit position in relation to the enclosure opening.

According to yet another preferred embodiment of the invention, a conveyance positioned outside of the enclosure can be moved through the enclosure opening and parked on one of the conveyance parking spaces when the turntable is in the entrance/exit position.

According to yet another preferred embodiment of the invention, a conveyance parked on a parking space positioned in the entrance/exit position can be moved off of the turntable and through the enclosure opening for use outside of the enclosure.

According to yet another preferred embodiment of the invention, the enclosure includes a fence.

According to yet another preferred embodiment of the invention, the enclosure includes an aircraft hangar.

According to yet another preferred embodiment of the invention, the turntable can be rotated to a security position in which none of the conveyance parking spaces are positioned in the entrance/exit position, and no conveyance supported on the turntable can pass through the enclosure opening.

According to yet another preferred embodiment of the invention, the rotation assembly is electronically programmable to respond to input of a predetermined access code by rotating the turntable to position a predetermined parking space in the entrance/exit position.

According to yet another preferred embodiment of the invention, the rotation assembly is electronically programmable to respond to input of a plurality of predetermined access codes, and each of the predetermined access codes corresponds to one of the conveyance parking spaces such that input of one of the predetermined access codes actuates rotation of the turntable to position a corresponding parking space in the entrance/exit position.

According to yet another preferred embodiment of the invention, the enclosure includes an aircraft hangar having a door opening. A hangar door is positioned over the door opening. The door is electronically programmable to automatically open in response to input of a predetermined access code.

According to yet another preferred embodiment of the invention, the turntable has an outer diameter of 10 feet to 300 feet.

According to yet another preferred embodiment of the invention, equipment can be stored within the stationary core.

According to yet another preferred embodiment of the invention, the support surface of the turntable is flush with the stationary core.

According to yet another preferred embodiment of the invention, the support surface of the turntable is flush with a surrounding surface disposed outside of the outer circumference of the turntable.

According to yet another preferred embodiment of the invention, a plurality of chocks are positioned on the support surface of the turntable. The chocks facilitate positioning of a conveyance within one of the parking spaces and prevent movement of the conveyance out of position with respect to adjacent conveyances.

According to yet another preferred embodiment of the invention, the position of the chocks on the surface is adjustable.

According to yet another preferred embodiment of the invention, the turntable includes an inner edge defining the central opening, and a plurality of spaced-apart casters are positioned on the inner edge. The casters engage the stationary core to allow for rotation of the turntable about the stationary core.

According to yet another preferred embodiment of the invention, a plurality of casters are mounted on the foundation surface and engage the turntable to rotate the turntable about the stationary core.

According to yet another preferred embodiment of the invention, the aircraft storage assembly includes an electric motor having drive means engaging the outer edge of the turntable for rotating the turntable about the stationary core.

According to yet another preferred embodiment of the invention, the drive means is selected from the group consisting of a semi-pneumatic drive wheel, gear to gear drive, and chain and gear drive.

According to yet another preferred embodiment of the invention, the foundation surface includes at least one swale for draining liquid into a drain opening for disposal.

According to yet another preferred embodiment of the invention, a conveyance storage assembly includes a turntable having a support surface sized for support no more than one conveyance thereon. The turntable is positioned within an enclosure having an opening sized to permit the conveyance to enter or exit through the enclosure. A rotation assembly is in communication with the turntable to rotate the turntable relative to the enclosure opening. The turntable is rotatable between a storage position in which the conveyance cannot enter or exit the enclosure, and a enter/exit position in which the conveyance may enter or exit the enclosure.

A method for storing a conveyance according to a preferred embodiment of the invention, includes the steps of providing a storage apparatus including an annular turntable having an outer circumference and a central opening defining a support surface therebetween for supporting at least one conveyance in at least one parking space thereon, and a foundation for supporting the turntable. A rotation assembly is positioned intermediate the turntable and the foundation for permitting rotation of the turntable on the foundation between storage and conveyance enter/exit positions. A stationary core is positioned in the central opening of the turntable, around which the turntable is mounted for rotation. An enclosure houses the turntable and defines an opening sized to permit only a single conveyance to enter or exit through the enclosure opening. The turntable is rotated to align one of the conveyance parking spaces with the opening. The conveyance is moved from a location outside of the enclosure through the opening and onto the conveyance parking space.

Another method for storing a conveyance according to a preferred embodiment of the invention, includes the step of rotating the turntable to a position in which none of the conveyance parking spaces are aligned with the opening, and the conveyance cannot be removed from the enclosure.

Yet another method for storing a conveyance according to a preferred embodiment of the invention, includes the step of rotating the turntable to a position in which none of the conveyance parking spaces are aligned with the opening, and the conveyance cannot be removed from said enclosure.

A method for removing a conveyance contained in a storage apparatus according to a preferred embodiment of the invention, includes the steps of providing a storage apparatus including an annular turntable having an outer circumference and a central opening defining a support surface therebetween for supporting at least one conveyance in at least one parking space thereon, and a foundation for supporting the turntable. A rotation assembly is positioned intermediate the turntable and the foundation for permitting rotation of the turntable on the foundation between storage and conveyance enter/exit positions. A stationary core is positioned in the central opening of the turntable and around which the turntable is mounted for rotation. An enclosure houses the turntable and defines an opening sized to permit only a single conveyance to enter or exit through the enclosure opening. The turntable is rotated to align one of the conveyance parking spaces supporting a conveyance thereon with the exit opening. Finally, the aligned conveyance is moved from the conveyance parking space through the opening to a location outside of the enclosure.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
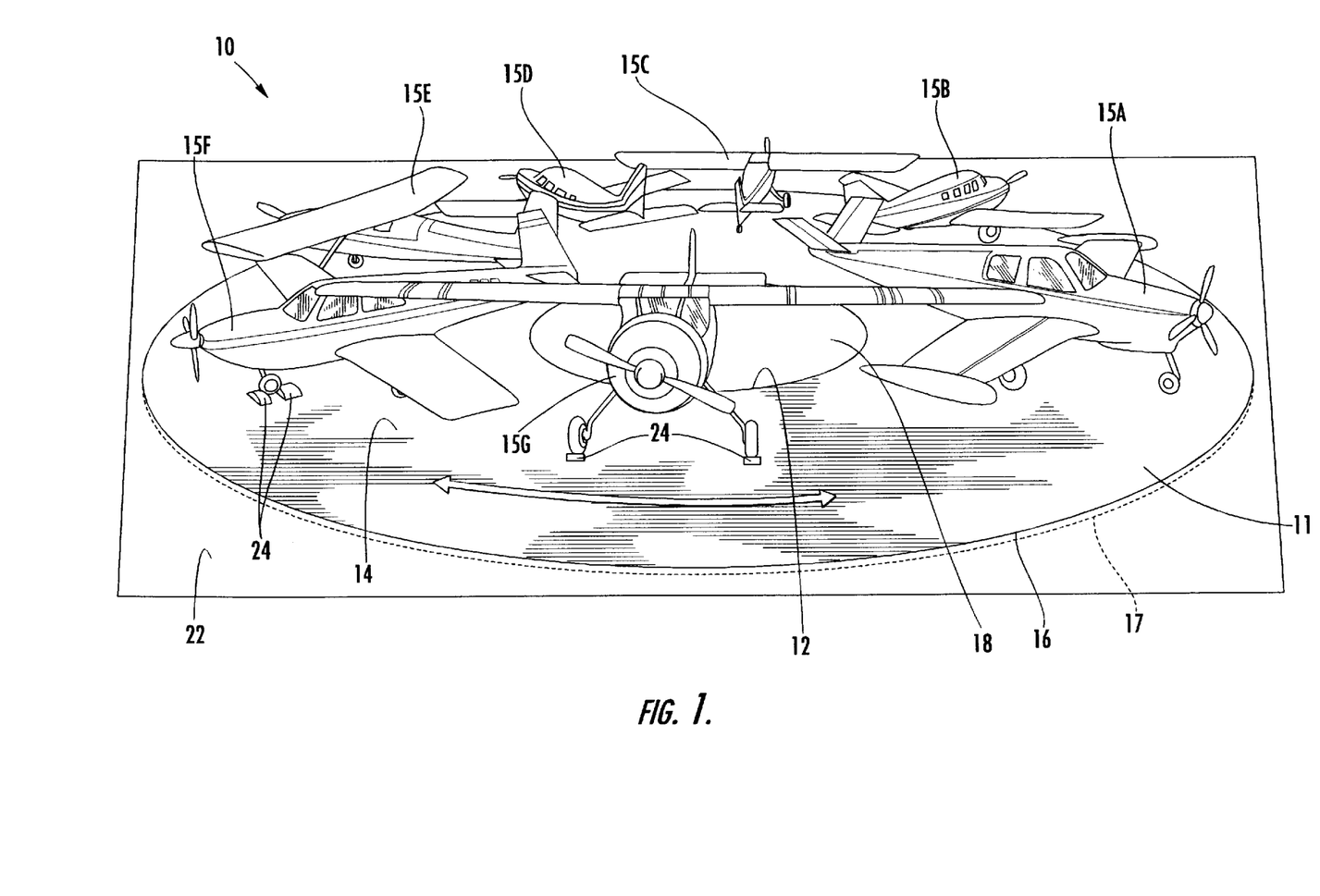
FIG. 1 is a perspective view of an aircraft storage assembly according to a preferred embodiment of the invention.

A preferred embodiment of an aircraft storage assembly according to the invention is illustrated in FIG. 1, and shown generally at reference numeral 10. The hangar assembly 10 includes a turntable 11 having a central opening defining an inner circumference 12, an upper surface 14 for supporting a plurality of aircraft 15A–H, an outer edge 16 defining an outer circumference 17, and a central foundation core 18. As can best be seen in FIG. 2, the upper surface 14 defines a plurality of aircraft parking spaces 14A–H extending the central opening 12, on which the aircraft 15A–H are parked.

The turntable 11 can be of any size, but is preferably 10 feet to 300 feet in diameter. Similarly, the central opening 12 and central core 18 can be any size.

Figure 2:
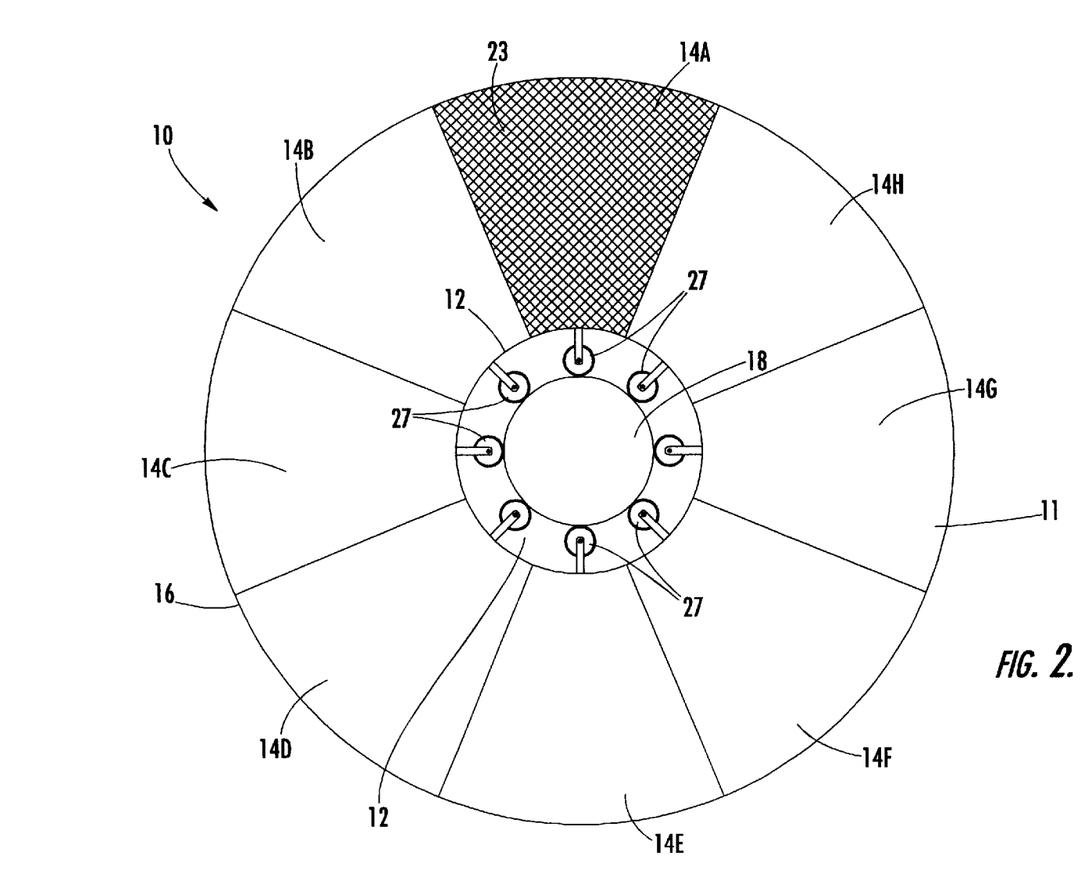
FIG. 2 is a top plan view of the aircraft storage assembly of FIG. 1, with the aircraft removed for clarity.
Figure 3:
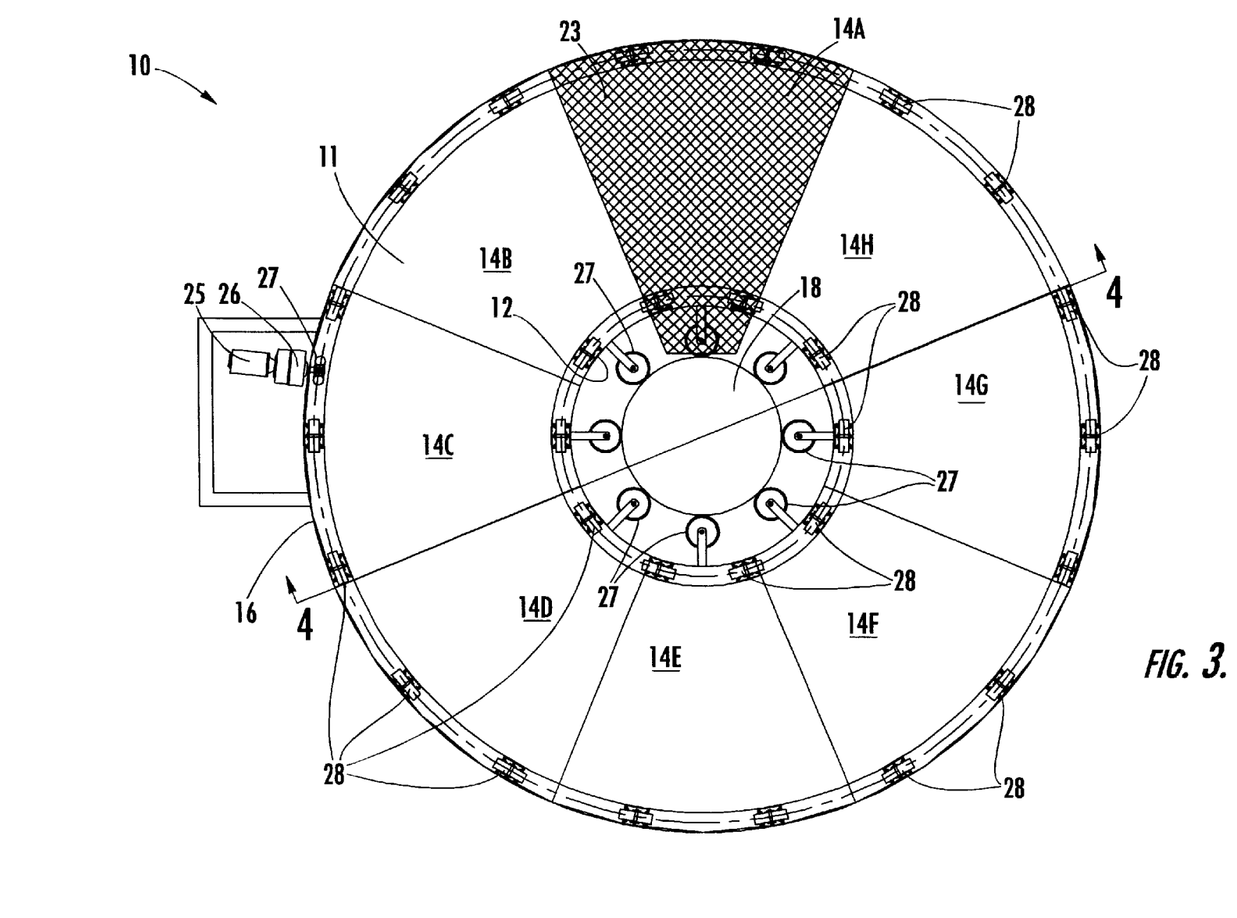
FIG. 3 is another top plan view of the aircraft storage assembly of FIG. 1, showing vertical casters positioned below the turntable
Figure 4:
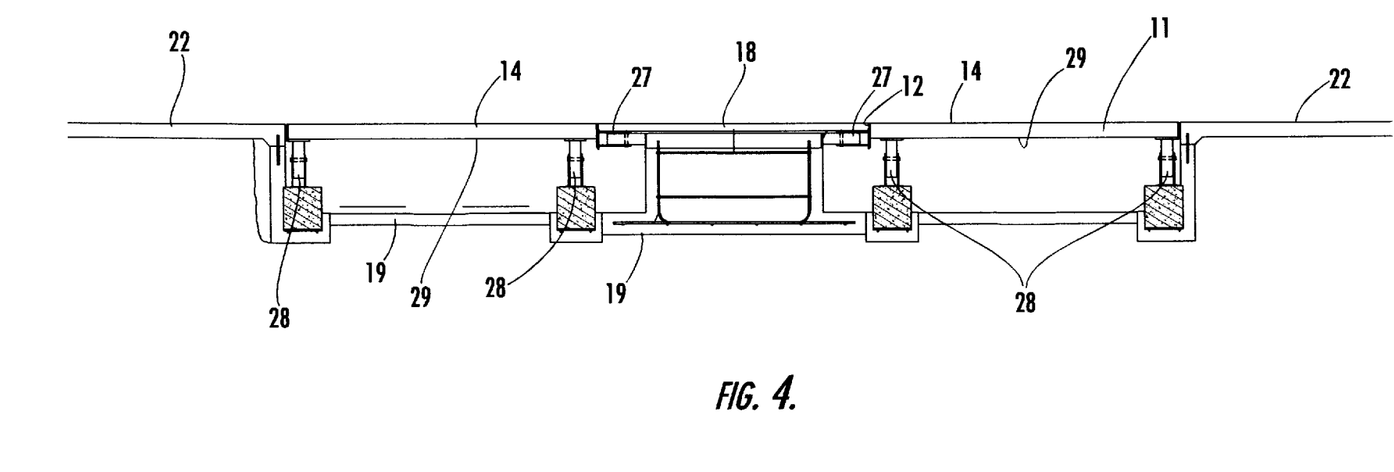
FIG. 4 is a cross sectional view of the aircraft storage assembly of FIG. 3, shown along lines 4—4.
Figure 5:
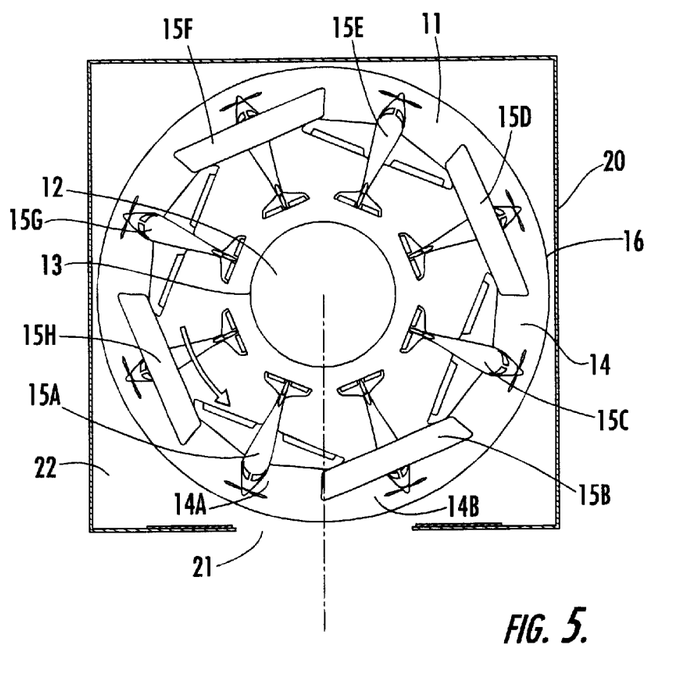
FIG. 5 is a top plan view of the aircraft storage assembly of FIG. 1 within an enclosure.
Figure 6:
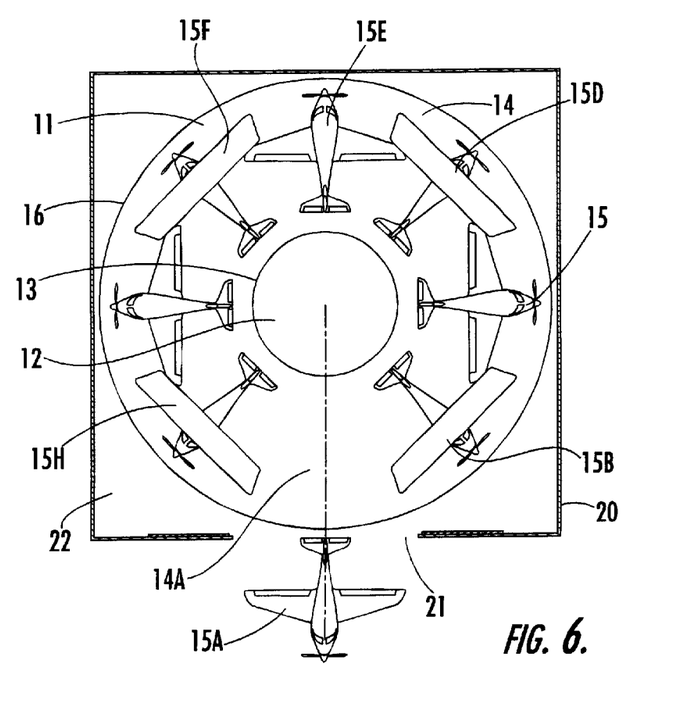
FIG. 6 is another top plan view of the aircraft storage assembly of FIG. 1 within an enclosure.

As shown in FIGS. 2–4, the turntable 11 is mounted for rotation around a central foundation core 18. As shown in FIG. 4, the central core 18 extends slightly upward from a foundation surface 19, and is positioned within the central opening 12. Preferably the upper surface 14 of the turntable 11 is flush with the central foundation core 18. As shown in FIGS. 5 and 6, the turntable 11 is positioned within an enclosure 20 and is oriented with respect to an exit position 21. The enclosure 20 may be an aircraft hangar or fence, and the exit position 21 may be a hangar door opening, fence opening or other exit means. Rotation of the turntable 11 moves a single parking space 14A into alignment with the exit position 21 so that the aircraft 15A parked in that particular parking space 14A can be moved off of the turntable 11 and through the exit position 21 for use outside of the enclosure 20.

The turntable 11 can be rotated again to align another parking space to allow for removal of another aircraft 15B–H. Preferably, the exit position 21 is located and sized so that only one of the parking spaces 14A–H can be aligned with the exit position 21 at any given time, so that only one of the aircraft 15A–H can be removed from the enclosure 20 at a time.

Preferably, the enclosure 20 is an aircraft hangar for storing aircraft 15A–H. The hangar may be square, round or any other desired shape. Two or more turntables 11 can be positioned in a single hangar, of whatever shape. In either case, the central foundation core 18 around which the turntable 11 rotates may be used for storage lockers, tool cabinets, and other needed equipment. Similarly, any space within the hangar and exterior to the outer edge 16 of the turntable 11 may be used for storage and, depending on size, may include offices and storage for tow trucks and other aircraft moving equipment. The central foundation core 18 may be any desired size as required to accommodate the turntable 11 within a given sized hangar.

Figure 7:
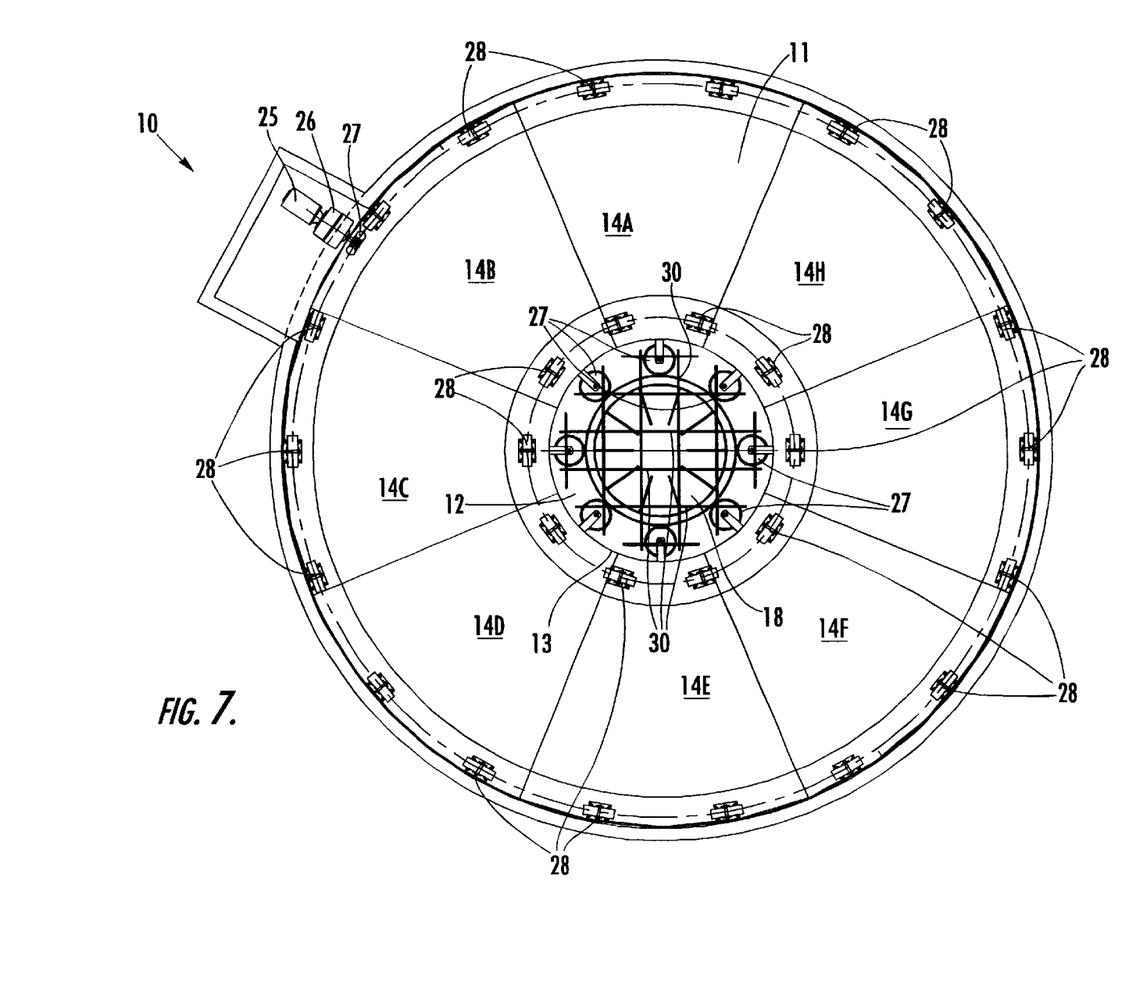
FIG. 7 is another top plan view of the aircraft storage assembly of FIG. 1 with supporting beams positioned over the central foundation core.

As shown in FIG. 7, a plurality of vertically extending supporting beams 30 can be positioned on the central core 18 to support the hanger at its center. By providing structural support to the hangar from within the center of the turntable 11, the cost of the hangar is lowered substantially due to reduced costs in the building materials necessary for the hangar. In contrast, prior art turntables that have no free space in their center, preclude the positioning of supporting structures in the center of the hangar. Due to the lack of center support, such hangars must compensate with higher cost building materials in order to maintain structural integrity.

Preferably, the upper surface 14 of the turntable 11 is flush with the central foundation core 18 and a surrounding floor 22 exterior to the outer edge 16 of the turntable 11, as shown in FIG. 1. The turntable 11 is preferably formed of a plurality of wedge-shaped sections 23 formed of steel ribs and covered with sheet steel, for example, 7 gauge, as shown in FIG. 2.

As is shown in FIG. 1, semi-permanent chocks 24 are positioned on the upper surface 14 to aid in positioning the aircraft properly within a particular parking space and to prevent movement of the aircraft 15A–H out of its position with respect to adjacent aircraft 15A–H. This design feature permits a very compact positioning arrangement. For example, high-wing and low-wing aircrafts such as Cessnas and Pipers can be parked next to each other with the respective high and low wings overlapping, as shown in FIGS. 1, 5 and 6. Chock placement can be used to control exactly where the aircraft 15A–H are positioned, along with decals or painted areas on the upper surface 14 to assist in guiding the aircraft 15A–H into and out of position. Labor involved in moving aircraft 15A–H out of the way to make room for another aircraft to exit is avoided altogether. This provision also avoids what is often referred to as "hangar rash." Alternatively, partitions can be positioned between each parking space 14A–H to ensure each aircraft 15A–H is parked in the proper space.

The doughnut-shaped design of the turntable 11 eliminates the need for center bearings and associated mechanisms, thus greatly reducing weight, mass, assembly and maintenance costs and capital costs. The turntable 11 is rotated by a small electric motor 25 and reduction gear box 26, such as a 2 HP explosion-proof motor with a 71-to-1 gear reducer. The motor 25 and gear box 26 drive the turntable 11 by engaging the outer edge 16 of the turntable 11 with a semi-pneumatic drive wheel 27. A gear-to-gear drive, chain and gear drive or other suitable drive means can be used in place of the semipneumatic drive wheel 26. Also, two or more motors 25 can be used to drive the turntable in large, heavy applications.

In addition, the motor 25 should preferably be a frequency drive motor attached to a PLC and positioned in a NEMA-2 enclosure. The motor 25 can adjust the speed of rotation of the turntable 11. The speed of the motor 25 gradually increases and decreases when starting and stopping in order to prevent wing tipping of aircraft 15A–H. This allows the aircraft 15A–H to be positioned closer together without danger of inadvertent contact.

As shown in FIGS. 3 and 4, the turntable 11 is centered on the central foundation core 18 and rotates around the core by means of horizontal casters 27 carried on the turntable 11 at the inner circumference defined by the central opening 12. The horizontal casters 27 engage the outer surface of the central core 18. The turntable 11 is supported by vertical casters 28 which are mounted on the foundation surface 19 below the turntable 11 and extend upwardly, engaging the bottom surface 29 of the turntable 11, shown in FIG. 4. This orientation allows dirt and debris to fall to the bottom of the foundation surface 19 instead of accumulating on the casters 28, as would be the case if the casters 28 were mounted on the turntable and extended downwardly onto the foundation surface 19.

The present invention allows great flexibility in incorporating the turntable 11 into hangars of differing configurations. In general, it is anticipated that for security reasons the hangar 20 would have only one door opening 21, and this door opening 21 would be only wide enough to allow any one of the aircraft 15A–H at a time to enter onto the turntable 11, and exit the hangar 20, as shown in FIGS. 5 and 6. Several different security features can be incorporated into the turntable/hangar design. The single door opening 21 preferably allows only one of the aircraft 15A–H at a time to be in position to exit the door opening 21, as shown in FIG. 6. The turntable 11 must be indexed to another position before another aircraft 15A–H can be moved into or removed from the hangar 20. Each aircraft location will preferably have its own security code, available only to hangar personnel and the owner/user of a particular aircraft 15A–H. Hangar personnel would, of course, have a master code allowing access to all of the aircraft 15A–H as needed to move them into and out of the hangar 20. An individual owner/user would have a magnetic card to be used in a card reader, or would be required to use a touch pad to enter a user code, or both, similar to use of an ATM card. Proper entry of the access code allows movement of the turntable 11 to an access position in which only that owner/user's particular aircraft is aligned with the door opening 21 and so only that particular aircraft can be removed from the hangar 20. In other words, a particular security code will allow the person authorized to use that code to move the turntable 11 to two positions—a security position (shown in FIG. 5) where no aircraft can be removed from the hangar, and an access position (shown in FIG. 6) where a particular aircraft 15A and only that particular aircraft 15A can be moved to or from the turntable 11. Preferably, the security code is tied electronically to both the door opening 21 and the turntable 11. When the security code is properly entered, the hangar door will begin to open and simultaneously the turntable 11 will begin rotating to bring the particular parking space 14A on which the owner/user's aircraft 15A belongs into alignment with the door opening 21. When in this access position, the owner/user's aircraft 15A can removed from the hangar 20 or moved into the hangar 20, as the case may be. In addition, other security mechanisms such as a finger print reader or eye retina scanner could be similarly used in conjunction with the turntable 11.

As shown in FIG. 5, the security position is preferably a position intermediate two access positions, whereby the turntable is oriented to the door opening such that neither of the aircraft 15A, 15B on the turntable 11 closest to the hangar door opening 21 is sufficiently aligned with the door opening 21 to allow for either aircraft 15A or 15B to be moved through the door opening 21. The security position may be any offset from the access position sufficient to prevent any aircraft 15A–H from being removed from the turntable 11 and the hangar 20. Thus, even if the hangar door is opened without the security code, no aircraft 15A–H can be removed from the hangar 20.

Another important feature of the turntable 11 is the ability to adjust the spacing of the chocks 24 to permit larger or smaller aircraft to be stored in particular locations. Of course, two or more doors openings 21 can be provided in the hangar 20. In such cases, the PLC would be programmed to open the door closest to the aircraft to be removed from or positioned onto the turntable 11, and to rotate the turntable 11 to the access position in relation to that particular door 21. Other security features are possible as well, including access to fuel and equipment lockers. The user can also be provided with an option as to which door opening 21 the turntable 11 will bring the aircraft 15A–H to if, for example, direct access to a particular area of the ramp or taxiway is desired. Interlocks between the turntable 11 and the aircraft 15A–H controlled by security codes are also possible.

Figure 8:
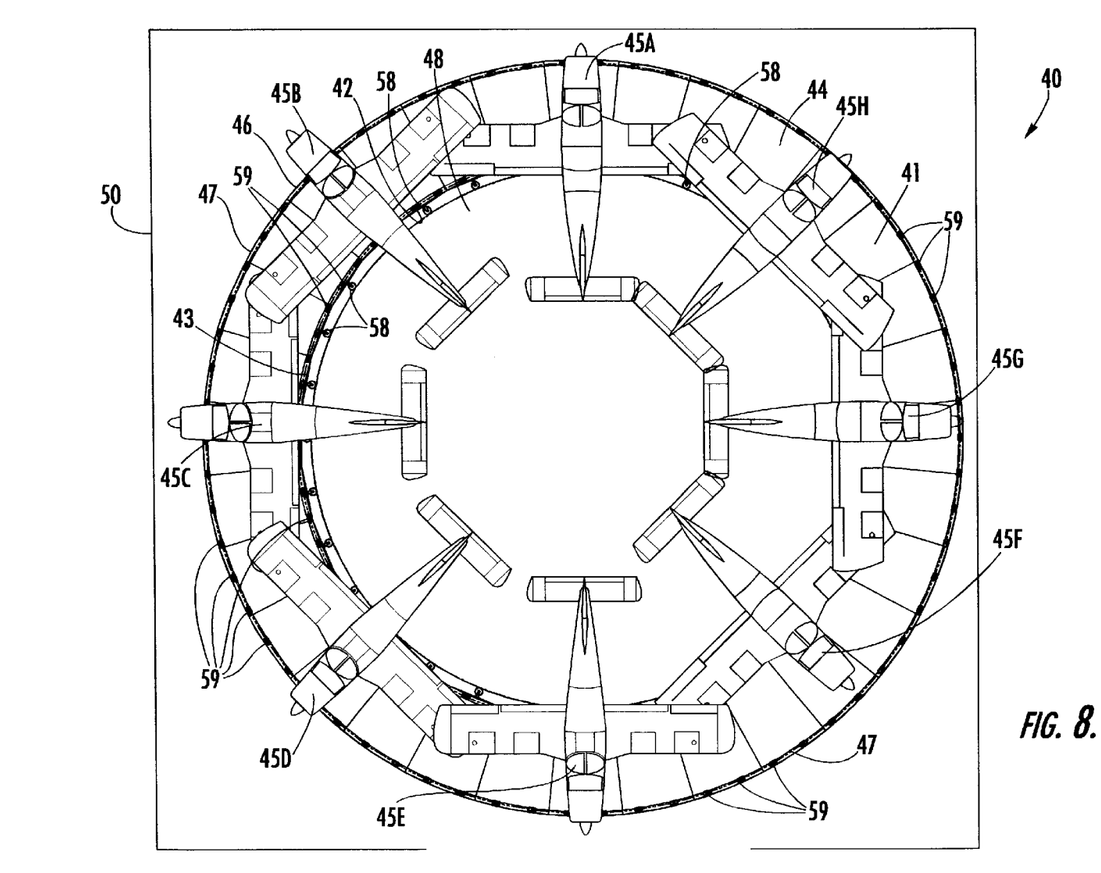
FIG. 8 is a top plan view of an aircraft storage assembly according to another preferred embodiment of the invention.

Another preferred embodiment of the invention is illustrated in FIG. 8, and shown generally at reference numeral 40. The aircraft storage assembly 40 comprises a turntable 41 having a central opening defining an inner circumference 42, an upper surface 44 for supporting a plurality of aircraft 45A–H, and an outer edge 46 defining an outer circumference 47. The turntable 41 is mounted for rotation around a central foundation core 48 extending upward from a foundation surface 49, shown in FIG. 10, and positioned within the central opening 42. The turntable 41 rotates around the central foundation core 48 by means of horizontal casters 58 and vertical casters 59. The storage assembly 40 is similar to storage assembly 10 in all respects, except that the area of the central opening 42 comprises a majority of the total area contained within the outer circumference 47 of the turntable 41.

Figure 9:
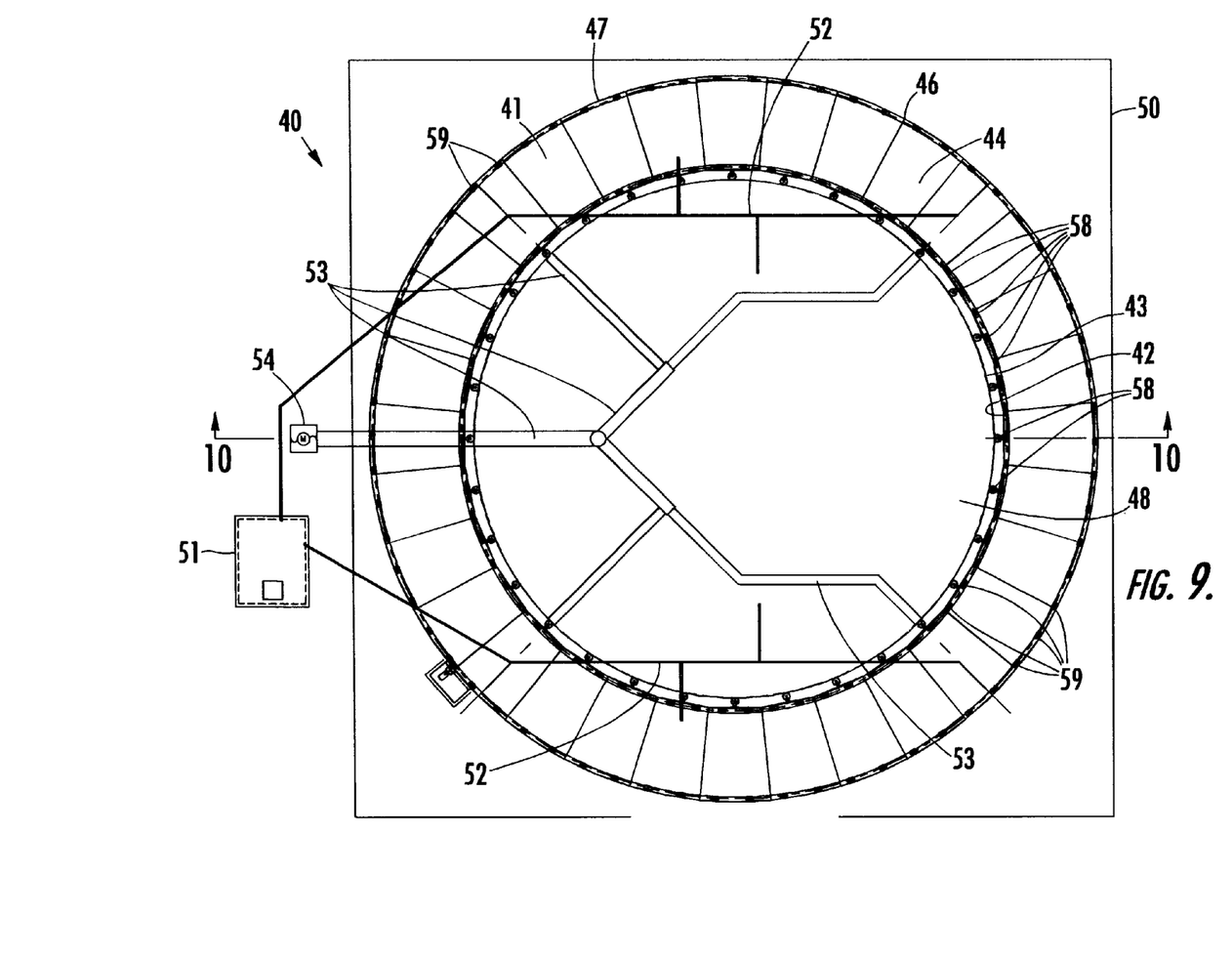
FIG. 9 is another top plan view of the aircraft storage assembly of FIG. 8, showing drainage and exhaust systems positioned under the turntable.
Figure 10:
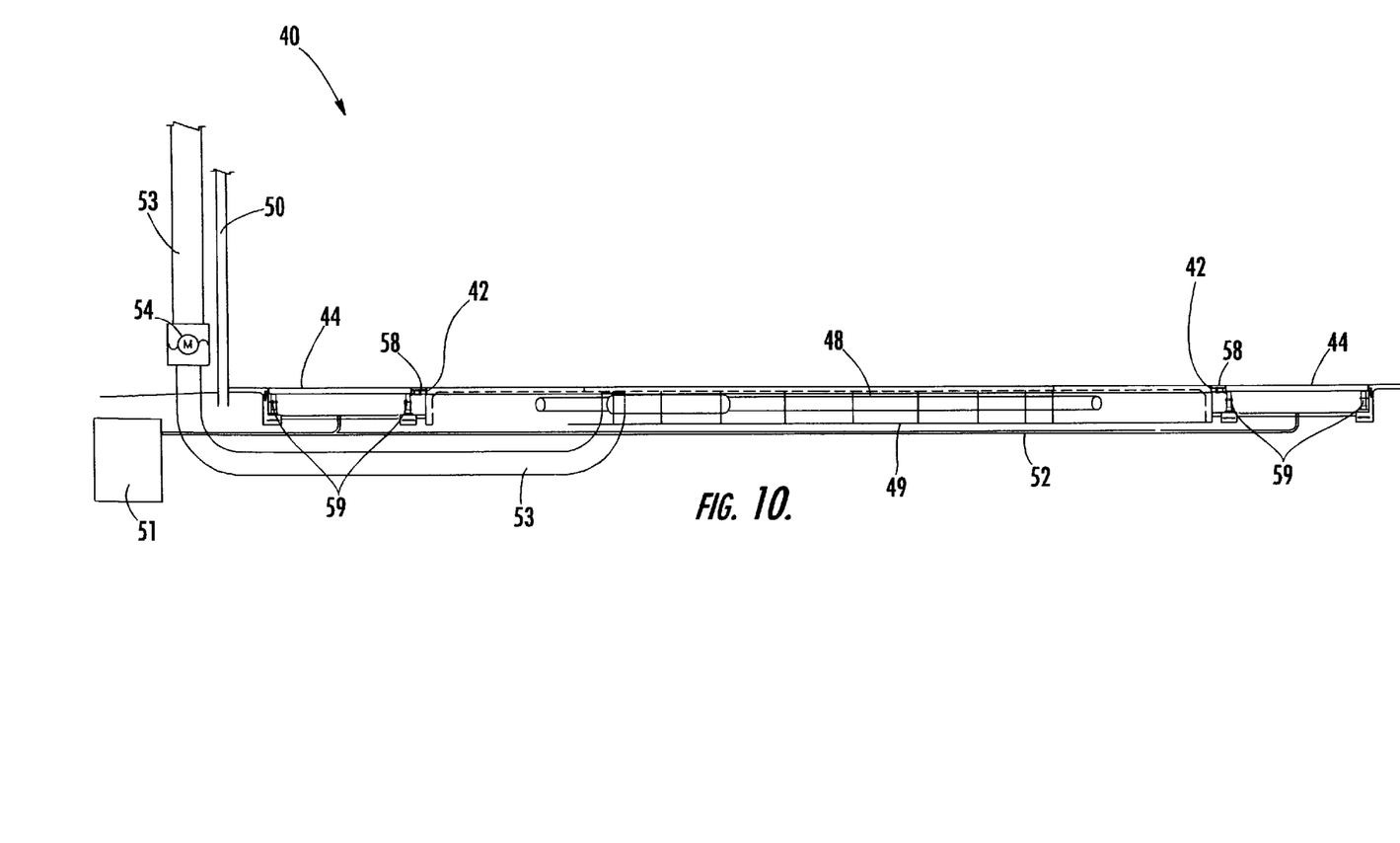
FIG. 10 is a cross sectional view of the aircraft storage assembly of FIG. 9, shown along lines 10—10.

In addition, the foundation surface 49 includes a drainage system with shallow swales which allow water or other liquids to drain to a drain opening, where the liquid is carried off to an in-ground spill containment vessel 51 by a series of drainage pipes 52, as shown in FIGS. 9 and 10. From containment vessel 51, the liquid can be carried off for discharge or disposal. The containment vessel 51 has a liquid capacity equal to that of the largest single fuel tank of any one of the aircraft 45A–H parked on the turntable 41. The containment vessel 51 is positioned outside of an enclosure 50 housing the turntable 41.

The hangar assembly 40 also has an exhaust system 52 positioned below the turntable 41, as shown in FIGS. 9 and 10. The exhaust system includes exhaust pipes 53 and an exhaust motor 54 for evacuating exhaust fumes from the enclosure 50 generated by the aircraft 45A–H.

Figure 11:
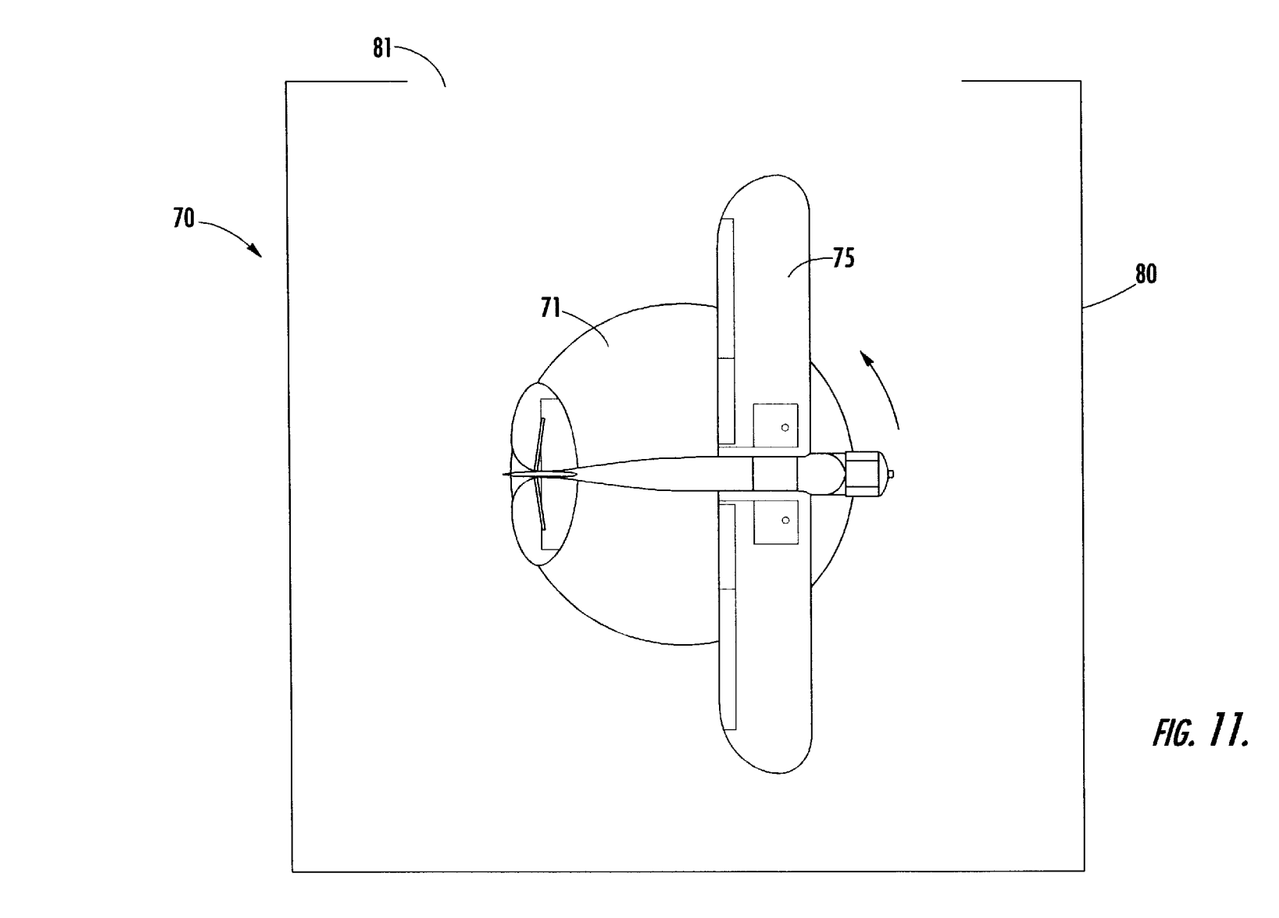
FIG. 11 is a top plan view of an aircraft storage assembly according to yet another preferred embodiment of the invention.

Yet another preferred embodiment according to the invention is illustrated in FIG. 11 and shown generally at reference numeral 70. The aircraft storage assembly 70 comprises a turntable 71 sized to support a single aircraft 75. The turntable 71 is positioned within an enclosure 80 having an opening 81. The aircraft 75 is stored in a security position in which it cannot be removed from the enclosure 80. When the aircraft 75 is desired for use outside of the enclosure, the turntable is rotated to position the aircraft 75 in an access position relative to the opening 81, in which the aircraft 75 can be moved out of the enclosure 80.

An aircraft storage assembly and method of using same is disclosed above. Various embodiments of the invention can be made without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A conveyance storage apparatus, comprising:
 (a) an annular turntable having an outer circumference and a central opening defining a support surface therebetween for supporting at least one conveyance;
 (b) a foundation for supporting the turntable;
 (c) a rotation assembly positioned intermediate the turntable and the foundation for permitting rotation of the turntable on the foundation between a security position and a conveyance enter/exit position; and
 (d) a stationary core positioned in the central opening of the turntable and around which the turntable is mounted for rotation;
 (e) a plurality of radially spaced-apart parking spaces on the support surface of said turntable for supporting said at least one conveyance thereon;
 (f) wherein said conveyance storage apparatus is positioned within an enclosure having an opening sized to permit only a single conveyance to enter or exit through the enclosure opening; and
 (g) further wherein said rotation assembly includes indexing means for moving any single parking space to the conveyance entrance/exit position in relation to the enclosure opening, and said turntable is rotatable to the security position in which none of said conveyance parking spaces are positioned in the entrance/exit position, whereby no conveyance supported on said turntable can pass through the enclosure opening.

2. A conveyance storage apparatus according to claim 1, and further comprising a plurality of radially spaced-apart parking spaces on the support surface of said turntable for supporting said at least one conveyance thereon.

3. A conveyance storage apparatus according to claim 2, wherein:
(a) said conveyance storage apparatus is positioned within the enclosure having the opening sized to permit only the single conveyance to enter or exit through the enclosure opening; and
(b) said rotation assembly includes indexing means for moving any single parking space to the conveyance entrance/exit position in relation to the enclosure opening.

4. A conveyance storage apparatus according to claim 3, wherein said turntable is rotatable to a security position in which none of said conveyance parking spaces are positioned in the entrance/exit position, whereby no conveyance supported on said turntable can pass through the enclosure opening.

5. A conveyance storage apparatus according to claim 1, wherein said at least one conveyance can enter or exit the enclosure only when said turntable is in the entrance/exit position.

6. A conveyance storage apparatus according to claim 1, wherein the enclosure comprises a fence.

7. A conveyance storage apparatus according to claim 1, wherein the enclosure comprises an aircraft hangar.

8. A conveyance storage apparatus according to claim 7, and further comprising at least one support member positioned on said stationary core and extending to said aircraft hangar for structurally supporting said hangar.

9. A conveyance storage apparatus according to claim 1, wherein said rotation assembly is electronically programmable to respond to input of a predetermined access code by rotating said turntable to position a predetermined parking space in the entrance/exit position.

10. A conveyance storage apparatus according to claim 1, wherein said rotation assembly is electronically programmable to respond to input of a plurality of predetermined access codes, wherein each of said predetermined access codes corresponds to one of said conveyance parking spaces such that input of one of said predetermined access codes actuates rotation of said turntable to position a corresponding parking space in the entrance/exit position.

11. A conveyance storage apparatus according to claim 1, wherein said turntable defines an outer diameter of 10 feet to 300 feet.

12. A conveyance storage apparatus according to claim 1, wherein equipment can be stored within said stationary core.

13. A conveyance storage apparatus according to claim 1, wherein said foundation surface includes at least one swale for draining liquid into a drain opening for disposal.

14. A conveyance storage apparatus comprising:
(a) an annular turntable having an outer circumference and a central opening defining a support surface therebetween for supporting at least one conveyance thereon;
(b) a foundation for supporting the turntable;
(c) a rotation assembly positioned intermediate the turntable and the foundation for permitting rotation of the turntable on the foundation between a storage position and a conveyance enter/exit position;
(d) a stationary core positioned in the central opening of the turntable and around which the turntable is mounted for rotation;
(e) a plurality of radially spaced-apart parking spaces on the support surface of said turntable for supporting said at least one conveyance thereon;
(f) wherein said conveyance storage apparatus is positioned within an enclosure having an opening sized to permit only a single conveyance to enter or exit through the enclosure opening, and said rotation assembly includes indexing means for moving any single parking space to a conveyance entrance/exit position in relation to the enclosure opening, and said rotation assembly is electronically programmable to respond to input of at least first and second predetermined access codes, wherein said first predetermined access codes corresponds to one of said conveyance parking spaces such that input of said first predetermined access code actuates rotation of said turntable to position a corresponding parking space in the entrance/exit position; and
(g) further wherein the enclosure comprises an aircraft hangar having a door opening, a hangar door positioned over the door opening and opening means for opening the hangar door, said opening means electronically programmable to respond to input of said second predetermined access code by opening the hangar door.

15. A conveyance storage apparatus according to claim 14, wherein said at least one conveyance can enter or exit the enclosure only when said turntable is in the entrance/exit position.

16. A conveyance storage apparatus comprising:
(a) an annular turntable having an outer circumference and a central opening defining a support surface therebetween for supporting at least one conveyance in at least one parking space thereon;
(b) a foundation for supporting the turntable;
(c) a rotation assembly positioned intermediate the turntable and the foundation for permitting rotation of the turntable on the foundation between a storage position and a conveyance enter/exit position; and
(d) a stationary core positioned in the central opening of the turntable and around which the turntable is mounted for rotation, wherein said support surface of said turntable is flush with said stationary core.

17. A conveyance storage apparatus according to claim 16, wherein said support surface of said turntable is flush with a surrounding surface disposed outside of the outer circumference of said turntable.

18. A conveyance storage apparatus according to claim 16, and further comprising a plurality of chocks positioned on said support surface of said turntable for positioning said at least one conveyance within one of said parking spaces and preventing movement of said conveyance out of position with respect to adjacent conveyances.

19. A conveyance storage apparatus according to claim 18, wherein the position of said plurality of chocks on said surface is adjustable.

20. A conveyance storage apparatus comprising:
(a) an annular turntable having an outer circumference and a central opening defining a support surface therebetween for supporting at least one conveyance in at least one parking space thereon, wherein said turntable includes an inner edge defining the central opening;
(b) a foundation for supporting the turntable;
(c) a rotation assembly positioned intermediate the turntable and the foundation for permitting rotation of the turntable on the foundation between a storage position and a conveyance enter/exit position;
(d) a stationary core positioned in the central opening of the turntable and around which the turntable is mounted for rotation; and
(e) a plurality of spaced-apart casters positioned on the inner edge and engaging said stationary core for rotating said turntable about said stationary core.

21. A conveyance storage apparatus according to claim 20, and further comprising a plurality of casters mounted on said foundation and engaging said turntable for rotating said turntable about said stationary core.

22. A conveyance storage apparatus according to claim 20, wherein:
(a) said conveyance storage apparatus is positioned within an enclosure having an opening sized to permit only a single conveyance to enter or exit through the enclosure opening; and
(b) said rotation assembly includes indexing means for moving any single parking space to the conveyance entrance/exit position in relation to the enclosure opening.

23. A conveyance storage apparatus according to claim 22, wherein said at least one conveyance can enter or exit the enclosure only when said turntable is in the entrance/exit position.

24. A conveyance storage apparatus comprising:
(a) an annular turntable having an outer circumference and a central opening defining a support surface therebetween for supporting at least one conveyance in at least one parking space thereon;
(b) a foundation for supporting the turntable;
(c) a rotation assembly positioned intermediate the turntable and the foundation for permitting rotation of the turntable on the foundation between a storage position and a conveyance enter/exit position;
(d) a stationary core positioned in the central opening of the turntable and around which the turntable is mounted for rotation; and
(e) an electric motor having drive means engaging and outer edge of said turntable for rotating said turntable about said stationary core.

25. A conveyance storage apparatus according to claim 24, wherein said drive means is selected from the group consisting of a semi-pneumatic drive wheel, gear to gear drive, and chain and gear drive.

26. A conveyance storage apparatus, comprising:
(a) a turntable having a support surface sized for supporting no more than one conveyance thereon;
(b) an enclosure having an opening sized to permit said conveyance to enter or exit through the enclosure, said turntable positioned within said enclosure;
(c) a rotation assembly in communication with said turntable for rotating said turntable relative to the enclosure opening, wherein said turntable is rotatable between a storage position in which the conveyance cannot enter or exit the enclosure, and an enter/exit position in which the conveyance may enter or exit the enclosure.

27. A method for storing a conveyance comprising the steps of:
(a) providing a storage apparatus comprising:
(i) an annular turntable having an outer circumference and a central opening defining a support surface therebetween for supporting at least one conveyance in at least one parking space thereon,
(ii) a foundation for supporting the turntable,
(iii) a rotation assembly positioned intermediate the turntable and the foundation for permitting rotation of the turntable on the foundation between storage and conveyance enter/exit positions,
(iv) a stationary core positioned in the central opening of the turntable and around which the turntable is mounted for rotation, and
(v) en enclosure housing the turntable and defining an opening sized to permit only a single conveyance to enter or exit through the enclosure opening;
(b) rotating said turntable to align one of said conveyance parking spaces with the opening;
(c) moving said at least one conveyance from a location outside of the enclosure through the opening and onto said conveyance parking space; and
(d) rotating said turntable to a position in which none of said conveyance parking spaces are aligned with the opening, whereby said at least one conveyance cannot be removed from said enclosure.

28. A method for storing a conveyance according to claim 27, further comprising the step of repeating steps (b) and (c) a predetermined number of times until a predetermined number or conveyances are parked on said turntable.

* * * * *

UNITED STATES PATENT AND TRADEMARK OFFICE
CERTIFICATE OF CORRECTION

PATENT NO.   : 6,672,221 B2  
DATED        : January 6, 2004  
INVENTOR(S)  : Hadley, Carleton J.

Page 1 of 1

It is certified that error appears in the above-identified patent and that said Letters Patent is hereby corrected as shown below:

Column 8,
Line 44, delete "and".

Column 11,
Line 33, delete "and" and enter -- an --.

Signed and Sealed this

Eighteenth Day of October, 2005

JON W. DUDAS
*Director of the United States Patent and Trademark Office*